United States Patent [19]
Karppala, Jr.

[11] Patent Number: 4,888,805
[45] Date of Patent: Dec. 19, 1989

[54] STEREO HEAD HEADPHONES BRACKET SYSTEM

[76] Inventor: Lauri A. Karppala, Jr., P.O. Box 19911, Sacramento, Calif. 95819-0911

[21] Appl. No.: 274,840

[22] Filed: Nov. 23, 1988

[51] Int. Cl.⁴ .............................................. H04R 5/02
[52] U.S. Cl. ...................................... 381/25; 381/68.5
[58] Field of Search ............... 381/68.5, 25, 183, 188, 381/187; 128/866; 181/129

[56] References Cited

U.S. PATENT DOCUMENTS

| | | | |
|---|---|---|---|
| 2,424,935 | 7/1947 | Kimmel | 381/68.5 |
| 2,856,466 | 10/1958 | Gustafson et al. | 381/68.5 |
| 3,297,832 | 1/1967 | Brown | 381/68.5 |
| 3,807,526 | 4/1974 | Sygnator | 181/129 |
| 3,836,732 | 9/1974 | Johanson et al. | 381/68.5 |
| 3,856,007 | 12/1974 | Leight | 128/866 |
| 4,092,502 | 5/1978 | Jones | 379/450 |
| 4,633,498 | 12/1986 | Warnke et al. | 381/25 |

Primary Examiner—Forester W. Isen

[57] ABSTRACT

Each transducer of a pair of stereo headphones is mounted on a respective eyeglass temple using socket receivers mounted on the respective transducer and the respective temple, and joining them with a piece of semirigid wire having on each end thereof a plug mateable with a respective socket receiver. This forms an adjustable mounting system.

2 Claims, 2 Drawing Sheets

STEREO HEAD HEADPHONES BRACKET SYSTEM

TECHNICAL FIELD

This invention relates to a stereo headphones bracket system used with eyeglasses.

BACKGROUND ART

The prior art research has clearly shown a number of interesting methods in using eyeglasses as a support base for various novel products U.S. Pat. No. 3,856,007 MR. LEIGHT Shows a hearing protection system using the eyeglasses temple arms to support a hearing safety device.

U.S. Pat. No. 3,807,526 MR. SYGNATOR Shows modified temple arms used to aid in protection of the hearing by holding sound reduction pads over the ears.

U.S. Pat. No. 3,297,832 MR. BROWN Shows the eyeglass temple arms being used and incorporated into a hearing aid system.

The above background art ranges from hearing protection to hearing assistants each using the eyeglasses as a base.

This invention relates to a stereo headphones bracket system. The invention includes an adjustable bracket arm having a headphone receiver block and a socket end with a socket receiver block. The adjustable arm is made of semirigid plastic coated metal wire or similar material. The adjustable arm has two square plastic blocks having length and attached to each end. The square plastic block attached to the headphone receiver end is glued to said receiver block. The headphone receiver block is a square hollow tube with wall thickness having length with a square plastic plug to close one end. One side of the receiver block has an elongated hole to receive a standard headphone attachment. A square block of plastic or similar material having length is attached to the opposite end of the adjustable arm which becomes a square male plug to fit the socket receiver block. The socket receiver block is a square hollow plastic tube with wall thickness having length with a square plastic plug to close one end. One side of the receiver block will be fitted to the temple arm of the eyeglasses frame. The socket receiver block provides attachment to the eyeglasses and receives the adjustable arm. The adjustable arm with male socket end gives the invention compete adjustment and tension control while being able to separate the system from the eyeglasses. The receiver block provides attachment of any standard headphones to the bracket system. The stereo headphone bracket system provides a novel multifunctional way of using headphones. The invention offers the use of eyeglasses combined with stereo listening convenience without the use of standard headphones. It also allows the user the convenience of one combined system. This system offers various other ramifications. For example, men and women who wear hats or head protection devices will have the ability to receive sound messages in stereo. Women and men alike with styled hair will find that this invention does not disturb their hair, whereas the headphone connecting strap currently in use disturbs the hair. Accordingly, the object of this invention is to provide a novel stereo headphone system which gives the user the freedom of convenience by eliminating the inconvenience of headphone headsets and their weight. Another object of the invention is to be able to remove this system from the eyeglasses and make it versatile. By removing the adjustable arm from the socket receiver the invention can be used with any eyeglasses that have socket receivers. This makes the stereo headphone bracket system versatile.

DESCRIPTION OF PREFERRED EMBODIMENTS

Figures 1, 2:
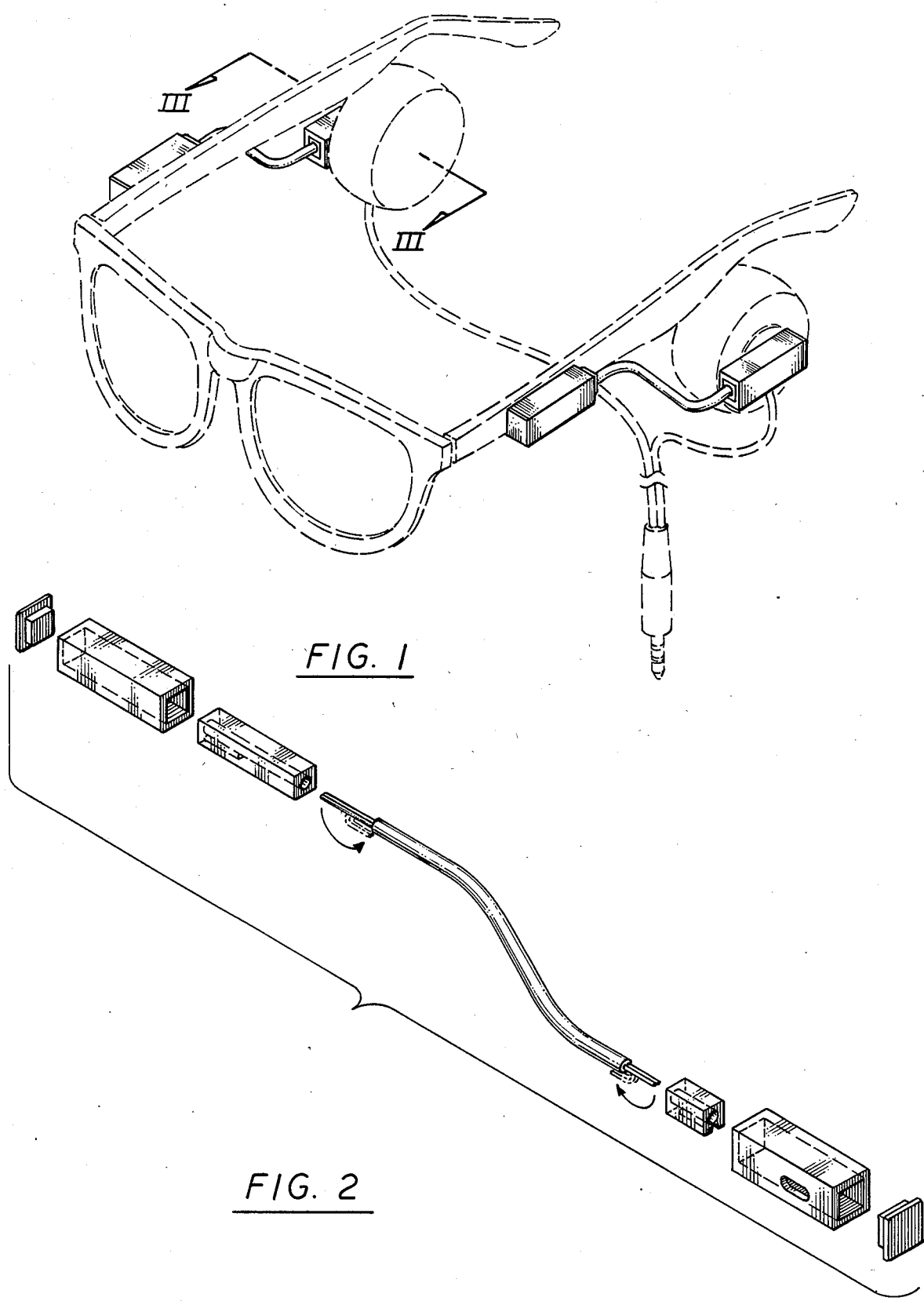
FIG. 1 Is a perspective view of a pair of eyeglasses with the invention attached. The stereo headphone bracket system is clearly shown with headphones and cord.
FIG. 2 Is an assembly view of invention as it illustrates the components involved.
Figure 3:
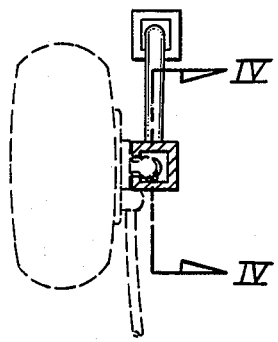
FIG. 3 Illustrates a cutaway view of FIG. 1 showing the mounting of the headphone receiver block through the elongated hole.
Figure 4:
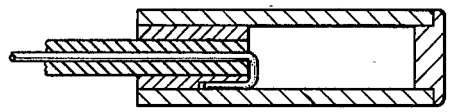
FIG. 4 Illustrates a cutaway view of FIG. 2 numerals 19, 20 and 21, showing the adjustable plastic coated wire fixed into square block installed directly into receiver block with end plug in place.
Figure 5:
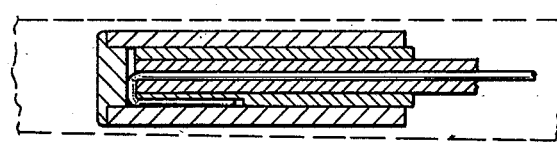
FIG. 5 Illustrates a cutaway view of FIG. 2, numerals 15, 17, 18 and 19, showing the cap numeral 15, socket receiver numeral 17, square male plug numeral 18, fixed to adjustable plastic coated wire numeral 19.
Figure 6:
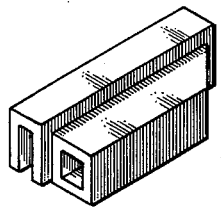
FIG. 6 Illustrates an alternative socket receiver which mounts to temple arms by a slot shown as numeral 24

The preferred embodiments, herein described, are not intended to limit the invention in any form or possible use. The embodiments are discribed to show and explain the practical use of this invention. referring now to the drawing, FIG. 1, the reference numeral 10 refers to a pair of eyeglasses being clear or shaded. These eyeglasses include temple arms 11 and 12, with reference numeral 13 the stereo headphones being attached to the stereo headphones bracket system reference numerals 14 and 14a. Refering to the assembly drawing FIG. 2, clearly illustrates the make up of said invention. Square plug caps reference numerals 15 and 16 are made from injection molded thermo plastic and fixed to socket receiver block reference numeral 17 and headphone receiver block reference numeral 21. The receiver blocks reference numerals 17 and 21 with the adjustable arm reference numeral 19 made of semirigid plastic coated wire as well as two square plastic blocks, one fixed to each end reference numeral 18 and 20. The said plastic blocks are all injection molded with thermoplastic material.

I claim:

1. A stereo headphone bracket system comprising, for each temple arm of a pair of eyeglasses, a socket receiver attached to the respective temple arm, a removable socket plug mated with said receiver, said plug attached at one end of semirigid plastic coated wire having a plastic molded plug at its other end, said molded plug mated to a receiver block attached to a respective stereo headphone.

2. A stereo headphone bracket system as claimed in claim 1, wherein each socket receiver is molded into a respective temple arm.

* * * * *